(12) United States Patent
Zhou et al.

(10) Patent No.: US 12,086,156 B2
(45) Date of Patent: Sep. 10, 2024

(54) METHOD AND DEVICE FOR STORING DATA IN A DISTRIBUTED DATABASE

(71) Applicant: HEFEI SWAYCHIP INFORMATION TECHNOLOGY INC., Anhui (CN)

(72) Inventors: Min Zhou, Beijing (CN); Junling Xiang, Beijing (CN); Ruimin Liu, Beijing (CN)

(73) Assignee: HEFEI SWAYCHIP INFORMATION TECHNOLOGY INC., Anhui (CN)

( * ) Notice: Subject to any disclaimer, the term of this patent is extended or adjusted under 35 U.S.C. 154(b) by 0 days.

(21) Appl. No.: 18/276,361

(22) PCT Filed: Jun. 14, 2022

(86) PCT No.: PCT/CN2022/081884
§ 371 (c)(1),
(2) Date: Aug. 8, 2023

(87) PCT Pub. No.: WO2023/103213
PCT Pub. Date: Jun. 15, 2023

(65) Prior Publication Data
US 2024/0037119 A1 Feb. 1, 2024

(30) Foreign Application Priority Data
Dec. 8, 2021 (CN) .......................... 202111488732.6

(51) Int. Cl.
*G06F 16/27* (2019.01)
*G06F 16/22* (2019.01)
(52) U.S. Cl.
CPC ............ *G06F 16/27* (2019.01); *G06F 16/221* (2019.01)
(58) Field of Classification Search
CPC ................................ G06F 16/27; G06F 16/221
(Continued)

(56) References Cited

U.S. PATENT DOCUMENTS

2016/0042019 A1 2/2016 Oks et al.
2016/0078079 A1 3/2016 Hu et al.
(Continued)

FOREIGN PATENT DOCUMENTS

CN 101840377 A 9/2010
CN 107077480 A 8/2017
(Continued)

OTHER PUBLICATIONS

International Search Report issued Aug. 17, 2022 for PCT/CN2022/081884.

*Primary Examiner* — Robert W Beausoliel, Jr.
*Assistant Examiner* — Lauren Zannah Ganger
(74) *Attorney, Agent, or Firm* — Schmeiser, Olsen & Watts, LLP

(57) ABSTRACT

A method and device for storing data in a distributed database according to a row storage mode and a column storage mode, respectively, the method including: when a change is detected in the data in the row storage mode, obtaining the target row data that has changed based on a preset synchronization policy; determining the number of original data copies and the number of redundant data copies based on the attribute information and the number of failure-resistant nodes of the target row in which the target row data is located; coding the target row data in accordance with a predetermined corrective coding algorithm based on the number of original data copies and the number of redundant data copies, generating coded data; and distributing each copy of the coded data equally by column or group of columns to different nodes in the distributed database for storage.

10 Claims, 6 Drawing Sheets

(58) Field of Classification Search
USPC .......................................................... 707/364
See application file for complete search history.

(56) References Cited

U.S. PATENT DOCUMENTS

| | | | |
|---|---|---|---|
| 2018/0101308 A1* | 4/2018 | Kazi | G06F 21/6218 |
| 2022/0253355 A1* | 8/2022 | Resch | G06F 11/2094 |
| 2023/0396673 A1* | 12/2023 | Pinczel | G06F 16/27 |

FOREIGN PATENT DOCUMENTS

| | | |
|---|---|---|
| CN | 110347344 A | 10/2019 |
| CN | 110515541 A | 11/2019 |
| CN | 110618895 A | 12/2019 |
| CN | 112835743 A | 5/2021 |
| CN | 113901069 A | 1/2022 |

\* cited by examiner

Table d' public.bmsql_stock

| Column | Type | Collation | Nullable | Default |
|---|---|---|---|---|
| s_w_id | integer | | not null | |
| s_i_id | integer | | not null | |
| s_quantity | integer | | | |
| s_ytd | integer | | | |
| s_order_cnt | integer | | | |
| s_remote_cnt | Integer | | | |
| s_data | character varying(50) | | | |
| s_dist_01 | character(24) | | | |
| s_dist_02 | character(24) | | | |
| s_dist_03 | character(24) | | | |
| s_dist_04 | character(24) | | | |
| s_dist_05 | character(24) | | | |
| s_dist_06 | character(24) | | | |
| s_dist_07 | character(24) | | | |
| s_dist_08 | character(24) | | | |
| s_dist_09 | character(24) | | | |
| s_dist_10 | character(24) | | | |

FIG. 7

| Node 1 | Node 2 | Node 3 | Node 4 | Node 5 | Node 6 | Node 7 | Node 8 | Node 9 |
|---|---|---|---|---|---|---|---|---|
| s_w_id, s_i_id, s_quantity | s_ytd | s_order_cnt | s_remote_cnt | s_data | r1 | r2 | r3 | NULL |
| s_dist_01 | s_dist_02 | s_dist_03 | s_dist_04 | s_dist_05 | r4 | r5 | r6 | NULL |
| s_dist_06 | s_dist_07 | s_dist_08 | s_dist_09 | s_dist_010 | r7 | r8 | r9 | NULL |

FIG. 8

METHOD AND DEVICE FOR STORING DATA IN A DISTRIBUTED DATABASE

CROSS-REFERENCE TO RELATED APPLICATIONS

This application claims priority to PCT Application No. PCT/CN2022/081884, having a filing date of Jun. 14, 2022, which claims priority to CN Application No. 202111488732.6, having a filing date of Dec. 8, 2021, the entire contents of both of which are hereby incorporated by reference.

FIELD OF TECHNOLOGY

The following refers to the field of database technology, more specifically, to a method and device for storing data in a distributed database.

BACKGROUND

With the advent of 5G, Cloud Computing, Internet of Everything, and Artificial Intelligence, the requirements for data generation, transmission, storage, and analysis are increasing. Among them, the data storage method has an important impact on the efficiency of data query.

Usually on-line transaction processing OLTP (On-Line Transaction Processing) systems use row storage, that is, data tables are stored continuously by row, so that the transaction-based transactions processed for the row are very efficient. And On-line Analytical Processing OLAP is data-oriented analysis, massive data queries but usually only a few columns of data per data table are used, so column storage is usually used, which reduces the amount of data read and projection operations, processing more efficient. With the increased demand for real-time processing of data analysis and the need for unified workloads, the HTAP (Hybrid Transactional/Analytical Processing) system, which supports both OLTP and OLAP scenarios in the same system, has emerged.

In order to implement HTAP, existing technologies usually use row and column hybrid storage, the first type of hybrid storage scheme is the existence of complete row storage data and column storage data; the second type of hybrid storage scheme is a hybrid row and column, such as PAX (Partition Attributes Cross), that is, the division of multiple rows into blocks, storage by column within blocks, usually the row block is exactly the size of a page. However, for the first type of hybrid storage scheme, the conversion of the format of rows and columns and data fast consistency between rows and columns through the extended Raft consistency protocol, the protocol interaction is cumbersome, with the number of Raft groups to be maintained increases, the communication pressure between nodes is also increasing; for the second type of hybrid storage scheme, it is difficult to do in both directions at the same time with separate OLTP, OLAP systems, affecting data processing efficiency.

In addition, while supporting row and column storage, the distributed database also needs to support data fragmentation and consistency among multiple copies of data, which increase the complexity and processing delay of the distributed database storage engine. Therefore, a more concise mixed storage solution with ranks and columns is needed, and a solution suitable for hardware acceleration is preferable.

Therefore, how to further improve the data storage efficiency and reliability of the distributed database is a technical problem to be solved.

SUMMARY

An aspect relates to a method for storing data in a distributed database to solve the technical problems of low data storage efficiency and low reliability of the distributed database in the conventional art.

The data in the distributed database are stored according to a row storage mode and a column storage mode, respectively, the method comprising:
 when a change is detected in the data in the row storage mode, obtaining the target row data that has changed based on a preset synchronization policy;
 determining the number of original data copies and the number of redundant data copies based on the attribute information and the number of failure-resistant nodes of the target row in which the target row data is located;
 coding the target row data in accordance with a predetermined corrective coding algorithm based on the number of original data copies and the number of redundant data copies, generating coded data comprising original data of the number of original data copies and redundant data of the number of redundant data copies;
 distributing each copy of the coded data equally by column or group of columns to different nodes in the distributed database for storage;
 wherein, the attribute information comprises the number of bytes of each column in the target row or the number of columns in the target row, the number of failure-resistant nodes being the number of nodes storing each copy of the redundant data.

In some embodiments of this application, if the attribute information is the number of bytes for each column in the target row, determining the number of copies of the original data and the number of copies of the redundant data based on the attribute information and the number of failure-resistant nodes in the row in which the target row data is located, specifically:
 determining the number of original data copies based on the sum of the number of bytes in each the row;
 determining the number of redundant data copies based on the product of the number of failure-resistant nodes and the maximum number of bytes in each the number of bytes.

In some embodiments of this application, if the attribute information is the number of columns, determining the number of original data copies and the number of redundant data copies based on the attribute information and the number of failure-resistant nodes in the row in which the target row data is located, specifically:
 determining the number of original data copies based on the number of columns or the number of cells in each grouping;
 determining the number of redundant data copies based on the number of failure-resistant nodes;
 wherein, the grouping is generated by dividing the number of columns according to predetermined grouping rules, the number of cells in each the grouping being equal, each the cell being a single column or a group of columns;
 the group of columns is generated after grouping a plurality of columns based on query relevance or after grouping based on the sum of the byte lengths of the columns.

In some embodiments of this application, if the attribute information is the number of columns, determining the number of original data copies and the number of redundant data copies based on the attribute information and the number of failure-resistant nodes of the target row in which the target row data is located, specifically:

$$M=\text{Ceiling}(L,n)$$

$$K=(M/n)*n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, n1 is the number of failure-resistant nodes, Ceiling is a ceiling function.

In some embodiments of this application, the changes include adding, updating or deleting, and the preset synchronization strategy includes log synchronization.

Accordingly, embodiments of the present invention also propose a device for storing data in a distributed database, characterized in that, the data in the distributed database is stored in accordance with a row storage mode and a column storage mode, respectively, the device comprising:
- an acquisition module, for obtaining the target row data that has changed based on a preset synchronization policy, when a change is detected in the data in the row storage mode;
- a determination module, for determining the number of original data copies and the number of redundant data copies based on the attribute information and the number of failure-resistant nodes of the target row in which the target row data is located;
- an coding module, for coding the target row data in accordance with a predetermined corrective coding algorithm based on the number of original data copies and the number of redundant data copies, generating coded data comprising original data of the number of original data copies and redundant data of the number of redundant data copies;
- a distribution module, distributing each copy of the coded data equally by column or group of columns to different nodes in the distributed database for storage;
- wherein, the attribute information comprises the number of bytes of each column in the target row or the number of columns in the target row, the number of failure-resistant nodes being the number of nodes storing each copy of the redundant data.

In some embodiments of this application, if the attribute information is the number of bytes for each column in the target row, the determination module, specifically for:
- determining the number of original data copies based on the sum of the number of bytes in each the row;
- determining the number of redundant data copies based on the product of the number of failure-resistant nodes and the maximum number of bytes in each the number of bytes.

In some embodiments of this application, if the attribute information is the number of columns, the determination module, specifically for:
- determining the number of original data copies based on the number of columns or the number of cells in each grouping;
- determining the number of redundant data copies based on the number of failure-resistant nodes;

wherein, the grouping is generated by dividing the number of columns according to predetermined grouping rules, the number of cells in each the grouping being equal, each the cell being a single column or a group of columns;

the group of columns is generated after grouping a plurality of columns based on query relevance or after grouping based on the sum of the byte lengths of the columns.

In some embodiments of this application, if the attribute information is the number of columns, the determination module, specifically for:

$$M=\text{Ceiling}(L,n)$$

$$K=(M/n)*n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, n1 is the number of failure-resistant nodes, Ceiling is a ceiling function.

In some embodiments of this application, the changes include adding, updating or deleting, and the preset synchronization strategy includes log synchronization.

By applying the above technical solution, when a change of data in the row storage mode is detected, the changed target row data is obtained based on a preset synchronization policy; the number of original data copies and the number of redundant data copies are determined based on the attribute information and the number of failure-resistant nodes of the target row in which the target row data is located; the target row data is coded according to a preset Erasure code algorithm based on the number of original data copies and the number of redundant data copies, generating coded data including the original data with the number of original data copies and the redundant data with the number of redundant data copies; the coded data are equally distributed to different nodes in the distributed database by column or column group for storage; where the attribute information includes the number of bytes of each column in the target row or the number of columns in the target row, the number of failure-resistant nodes is the number of nodes storing each copy of redundant data, and the data in the distributed database are stored in accordance with the row storage mode and column storage mode, which can support the efficient execution of OLAP system and OLTP system at the same time to achieve the columnar storage of row data while completing the column data fragmentation and data reliability processing, and can be suitable for hardware implementation, further improving the data storage efficiency and reliability of the distributed database.

BRIEF DESCRIPTION

Some of the embodiments will be described in detail, with references to the following Figures, wherein like designations denote like members, wherein:

FIG. 7 illustrates a schematic diagram of the information in the columns of the bmsql_stock table in the TPC-C test set in an embodiment of the present invention;

FIG. 8 illustrates a schematic diagram of the results of data distribution corresponding to FIG. 7.

DETAILED DESCRIPTION

The following is a clear and complete description of the technical solutions in the embodiments of the present application in conjunction with the accompanying drawings of the embodiments of the present application. Based on the embodiments in this application, all other embodiments obtained by a person of ordinary skill in the conventional art without creative labor fall within the scope of protection of this application.

Figure 1:
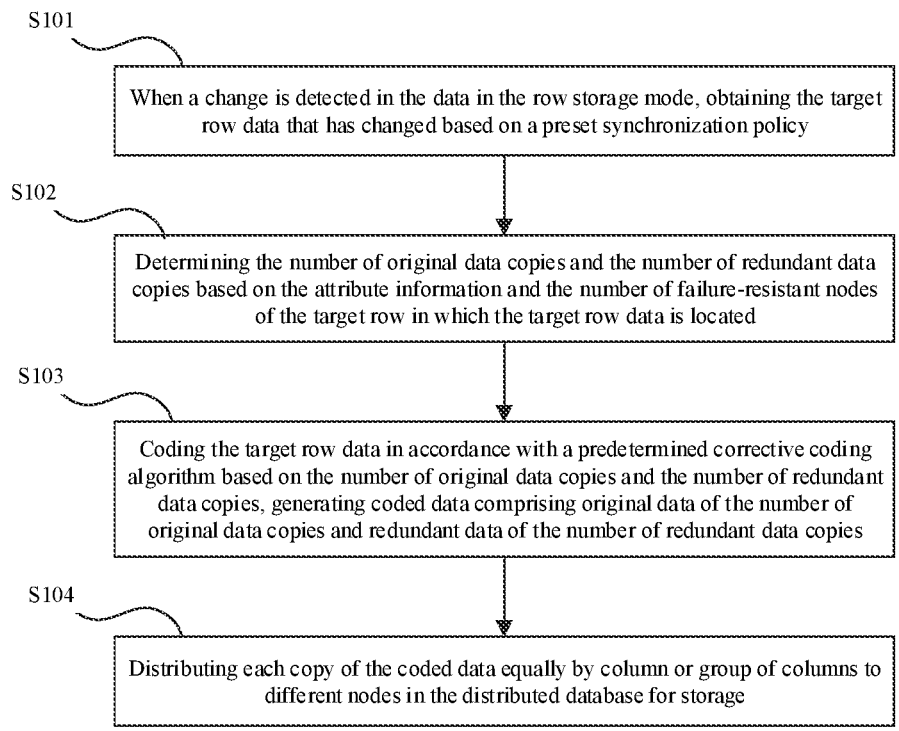
FIG. 1 illustrates a flow diagram of a method for storing data in a distributed database proposed by an embodiment of the present invention.

Embodiments of the invention provide a method for storing data in a distributed database, the data in the distributed database are stored according to a row storage mode and a column storage mode, that is, a hybrid scheme that uses row and column coexistence and stores the complete data separately. As shown in FIG. 1, the method comprises the following steps:

step S101, when a change is detected in the data in the row storage mode, obtaining the target row data that has changed based on a preset synchronization policy.

In this embodiment, the new and increased data of OLTP transactions are stored in row storage mode, which is mainly used to respond to transaction queries, mostly point queries and point updates. When a row data is changed in the row storage mode, obtaining the target row data that has changed based on a preset synchronization policy.

In order to improve the reliability of data processing, in some embodiments of this application, the changes include adding, updating or deleting, and the preset synchronization strategy includes log synchronization.

The skilled person in the conventional art may also pre-determine the synchronization strategy based on other consistent methods, which does not affect the scope of protection of this application.

Step S102, determining the number of original data copies and the number of redundant data copies based on the attribute information and the number of failure-resistant nodes of the target row in which the target row data is located.

In this embodiment, the attribute information includes the number of bytes of each column in the target row or the number of columns in the target row, and the number of failure-resistant nodes is the number of nodes storing each copy of the redundant data, so long as the number of failed or faulty nodes in the distributed database is not greater than the number of failure-resistant nodes, the data in the remaining nodes can be used to recover the original data. According to the attribute information and the number of anti-failure nodes, the number of original data copies and the number of redundant data copies can be determined, and the number of original data copies corresponds to the original data in the corrective coding algorithm, and the number of redundant data copies corresponds to the redundant data in the corrective coding algorithm.

In order to accurately determine the number of original data copies and the number of redundant data copies, in some embodiments of this application if the attribute information is the number of bytes for each column in the target row, determining the number of copies of the original data and the number of copies of the redundant data based on the attribute information and the number of failure-resistant nodes in the row in which the target row data is located, specifically:

determining the number of original data copies based on the sum of the number of bytes in each the row;

determining the number of redundant data copies based on the product of the number of failure-resistant nodes and the maximum number of bytes in each the number of bytes.

In this example, if the attribute information is the number of bytes of each column in each target row, determining the number of original data copies based on the sum of the number of bytes in each the row, determining the number of redundant data copies based on the product of the number of failure-resistant nodes and the maximum number of bytes in each the number of bytes.

Figure 2:
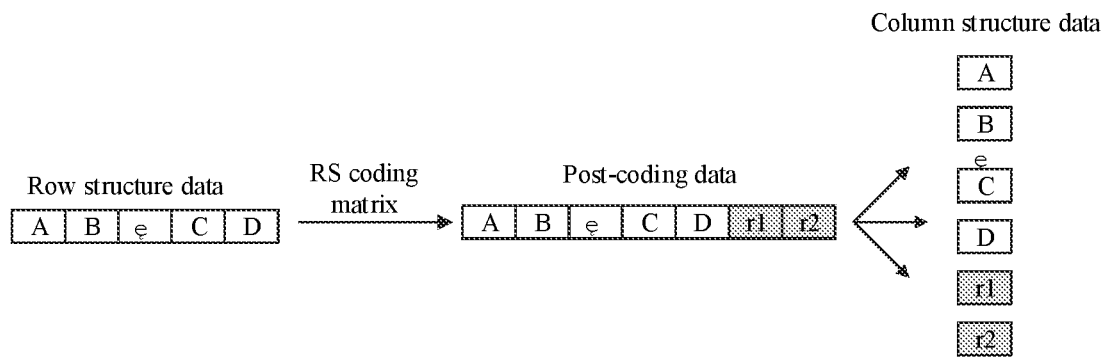
FIG. 2 illustrates a schematic diagram of the principle of data storage pattern change.
Figure 3:
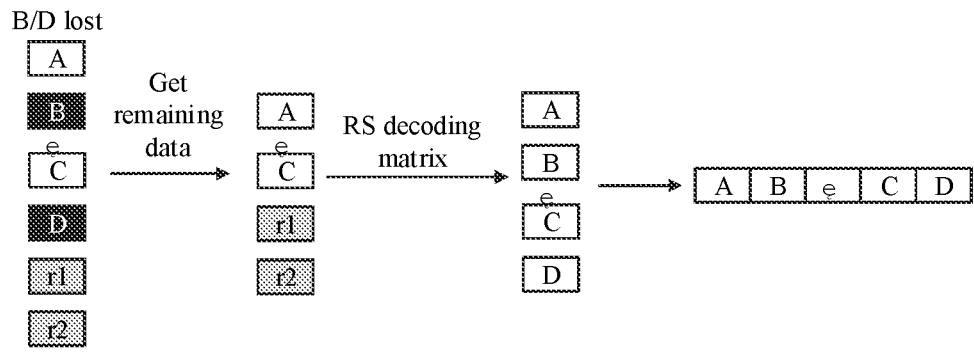
FIG. 3 illustrates a schematic diagram of the principle of coded data recovery.

Erasure code is a data protection method in which M (i.e., the number of original data copies) of the original data are coded to form K (i.e., the number of redundant data copies) of the redundant data to form M+K of the coded data, so that when any K copies of data are lost, the remaining data can be used to recover the original data and achieve the protection capability of K:M. Erasure code algorithm requires the same size of the data, but the actual application of the database table column field types are not equal, so the data column M value of the Erasure code is usually not equal to the number of columns of line data. At the same time, the same column of data also need to be stored together, in order to take advantage of the column storage. Therefore, in this embodiment, the data granularity selection and final data distribution in the code, need to do the corresponding processing, and further constraints on the selection of the number of redundant data K, for example, if a column of data contains three copies of encoded data, the redundant data K at least not less than 3 to ensure that the column of data loss, to successfully recover the lost data, FIG. 2 shows the schematic diagram of data storage pattern change, and FIG. 3 shows the schematic diagram of encoded data recovery, in FIG. 2 and FIG. 3, A, B . . . C, D are the original data, r1, r2 are the redundant data obtained by encoding.

The data granularity of the Erasure code is most simply calculated in bytes by row and distributed to the nodes by column. Each column of data, depending on the type, has its own value of one byte length, denoted as $d_j$ (indicating that the jth column has d copies of coded data, each copy of coded data is one byte), so that $M=\Sigma(d_j)$. If it is necessary to meet the failure of x nodes without data loss, the number of redundant data copies $K=x*\max(d_j)$ can be calculated. For example, suppose table A has 4 columns, $d_1=1$, $d_2=1$, $d_3=2$, $d_4=4$ which represent the length of each column (in bytes), then $\Sigma(d_j)=1+1+2+4=8$, $\max(d_j)=4$, after distributing each column to each node, the first node is 1 byte, the second node is 1 byte, and the third node is 2 bytes, the fourth node is 4 bytes, if you want to ensure that any node failure, data can be recovered, the number of redundant data bytes need to be 4 bytes in length, and distributed to the fifth node, so that when the fourth node failure, through the data information of nodes 1, 2, 3, 5, still can recover the valid data; when you need to ensure that any 2 node failure can be recovered, you need to choose 2 times the maximum $d_j$ (to ensure that the fourth node and a redundant node failure can be recovered), here 8 bytes, distributed to the fifth node and the sixth node, each 4 bytes.

In order to accurately determine the number of original data copies and the number of redundant data copies, in some embodiments of the present application if the attribute information is the number of columns, determining the number of original data copies and the number of redundant data copies based on the attribute information and the number of failure-resistant nodes in the row in which the target row data is located, specifically:

- determining the number of original data copies based on the number of columns or the number of cells in each grouping;
- determining the number of redundant data copies based on the number of failure-resistant nodes;
- wherein, the grouping is generated by dividing the number of columns according to predetermined grouping rules, the number of cells in each the grouping being equal, each the cell being a single column and/or a group of columns, the group of columns is generated after grouping a plurality of columns based on query relevance or after grouping based on the sum of the byte lengths of the columns.

Figure 4:
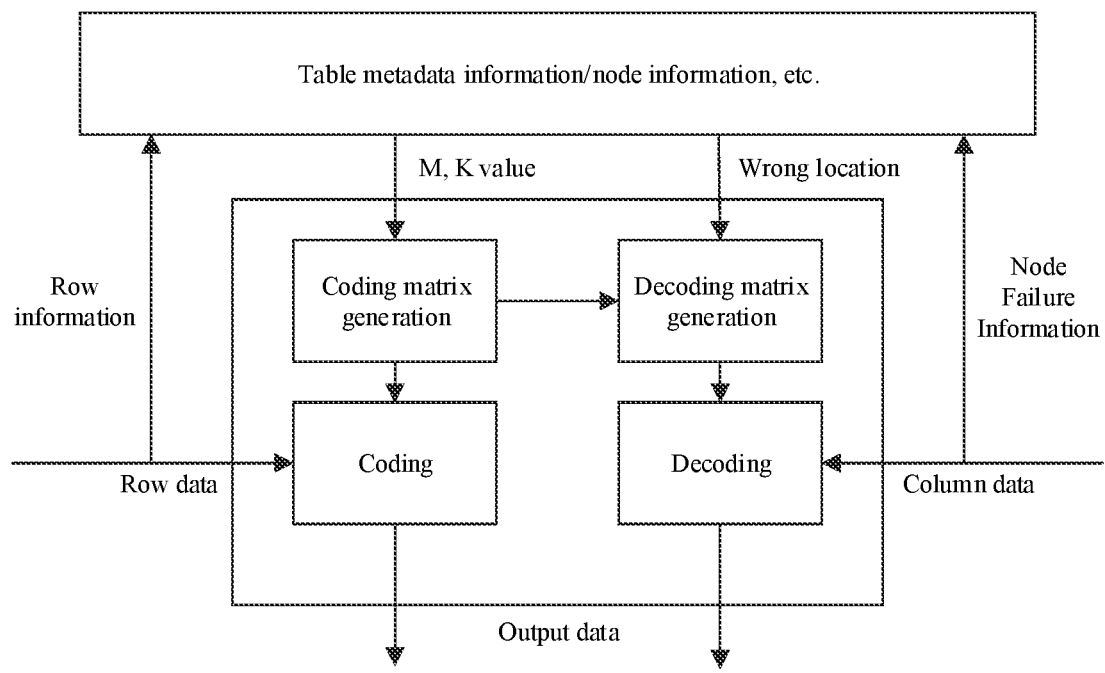
FIG. 4 illustrates a schematic diagram of the principle of coding and decoding based on a erasure code algorithm in an embodiment of the present invention.

In this embodiment, each logical table of the database has different column attributes, while the field types of the columns can be variable-length data types. This results in different tables with different row lengths, and even for the same table, the length of each row may be different. At the same time, take PostgreSQL as an example, the database can support up to 1.6 TB of rows, and the maximum number of columns per table can be between 250 and 1600 (depending on the type of columns), so the coding by row length and distribution by column can only be used for scenarios where the length of rows is small, the number of columns is small, and the length of rows is relatively fixed, and the automatic generation of coding matrix and decoding matrix is supported, as shown in FIG. 4.

Therefore, in order to expand the scope of application, the number of raw data copies is determined based on the number of columns or the number of cells in each grouping, and the number of redundant data copies is determined based on the number of the failure-resistant nodes. Specifically, if the number of columns of the table is small, the number of columns can be used as the number of original data copies; if the number of columns is large, the number of columns can be divided according to the predetermined grouping rules to generate a number of groups, the number of units in each group is equal, the number of units in each group as the number of original data copies, for example, if there are a total of A columns, it can be divided into three groups, each group has a1 columns, a2 columns, a3 columns, to meet a1=a2=a3, and a1+a2+a3=A.

It is also possible to generate a column group by merging multiple columns based on the query correlation, or by merging a column group based on the sum of the byte length of each column, so that the column group is placed in a node, and when the node fails, only one way of data loss is counted for the coded code block. Therefore, each cell can be a single column or a column group.

Figure 5:
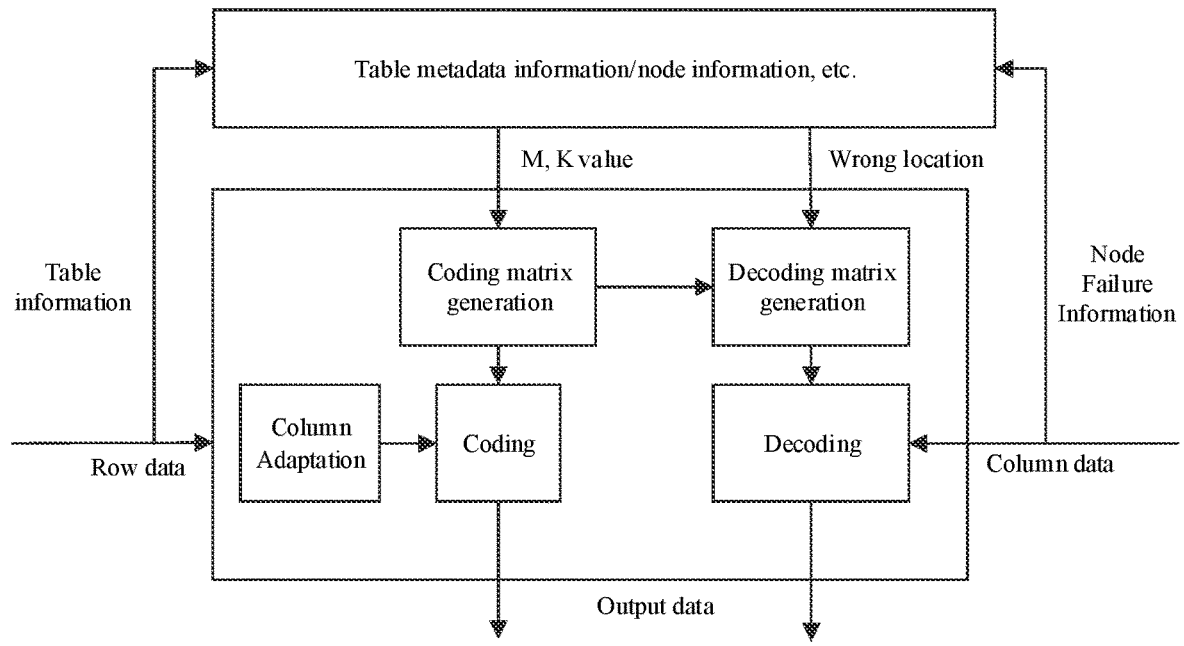
FIG. 5 illustrates a schematic diagram of the principle of coding and decoding based on the corrective coding algorithm in another embodiment of the present invention.
Figure 6:
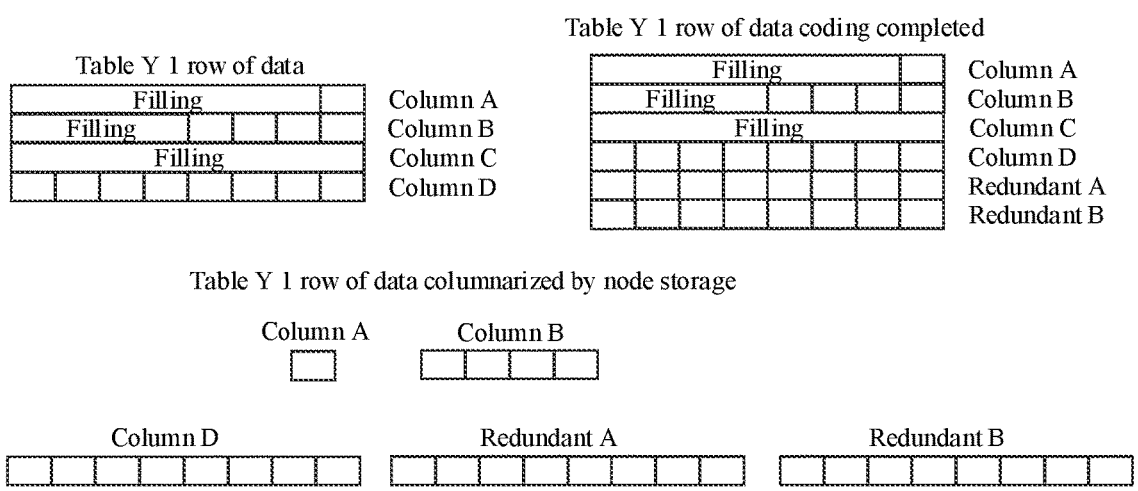
FIG. 6 illustrates a schematic diagram of the data storage principle corresponding to FIG. 5.

After the above processing, the number of columns in each row is taken as M value, and if the length of each column is not the same, the filling process is carried out. In this way, the generation matrix and decoding matrix of each table can be solidified without changing with the length of the rows, as shown in FIG. 5 for the corresponding coding and decoding principle based on the Erasure code algorithm, and FIG. 6 for the corresponding data storage principle.

In order to efficiently determine the number of original data copies and the number of redundant data copies, in some embodiments of this application, if the attribute information is the number of columns, determining the number of original data copies and the number of redundant data copies based on the attribute information and the number of failure-resistant nodes of the target row in which the target row data is located, specifically:

$$M = \text{Ceiling}(L, n)$$

$$K = (M/n) * n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, n1 is the number of failure-resistant nodes, Ceiling is a ceiling function.

In this embodiment, when the internal data bit width of the hardware implementation is large enough, it is also possible to not group the number of the columns, the number of original data copies and the number of redundant data copies are determined based on the number of columns, the number of failure-resistant nodes and combined with the number of nodes in the distributed database.

Step S103, coding the target row data in accordance with a predetermined corrective coding algorithm based on the number of original data copies and the number of redundant data copies, generating coded data comprising original data of the number of original data copies and redundant data of the number of redundant data copies.

In this embodiment, the predetermined Erasure code algorithm may include RS (Reed-solomon) code algorithm, array code algorithm, LDPC (Low Density Parity Check Code) algorithm, LRC (Locally Repairable Code) algorithm. The target row data is coded according to the predefined Erasure code algorithm, that is, the target row data is divided to obtain the original data of the number of original data copies, and the original data of the number of original data copies is coded to obtain the redundant data of the redundant data of the number of redundant data copies, so as to obtain multiple copies of coded data consisting of the original data of the number of original data copies and the redundant data of the redundant data of the number of redundant data copies.

Step S104, distributing each copy of the coded data equally by column or group of columns to different nodes in the distributed database for storage.

In this embodiment, if there is no coded data corresponding to the column group, the coded data are distributed equally to different nodes in the distributed database for storage; if there is coded data corresponding to the column group, the coded data are distributed equally to different nodes in the distributed database by column or column group for storage, so as to complete the column-oriented storage of the row data, and complete the column data slicing and data reliability at the same time.

By applying the above technical solution, when a change of data in the row storage mode is detected, the changed target row data is obtained based on a preset synchronization policy; the number of original data copies and the number of redundant data copies are determined based on the attribute information and the number of failure-resistant nodes of the target row in which the target row data is located; the target row data is coded according to a preset Erasure code algorithm based on the number of original data copies and the number of redundant data copies, generating coded data including the original data with the number of original data copies and the redundant data with the number of redundant data copies; the coded data are equally distributed to different nodes in the distributed database by column or column group for storage; where the attribute information includes the number of bytes of each column in the target row or the number of columns in the target row, the number of failure-resistant nodes is the number of nodes storing each copy of redundant data, and the data in the distributed database are stored in accordance with the row storage mode and column storage mode, which can support the efficient execution of OLAP system and OLTP system at the same time to achieve the columnar storage of row data while completing the column data fragmentation and data reliability processing, and can be suitable for hardware implementation, further improving the data storage efficiency and reliability of the distributed database.

In order to further elaborate the technical idea of embodiments of the present invention, the technical solution of embodiments of the present invention is described in the context of a specific application scenario.

Take the bmsql_stock table in the TPCC test set as an example, the information in each column of the table is shown in FIG. 7.

In FIG. 7, there are 17 columns and a total of 9 server nodes (i.e., nodes) available for deployment, which are required to resist the failure of three server nodes at the same time and still maintain the reliability of the data.

When a change in the data of a row in the row storage mode is detected, the coding generation matrix can be selected as the generation matrix with M=5 and K=3 parameters. At the same time, the three columns s_w_id, s_i_id, and s_quantity are selected as a group of columns for coding according to the historical data or the relevance of each column data query. In this way, the 17 columns are divided into three large groups:

the first group: (s_w_id, s_i_id, s_quantity), s_ytd, s_order_cnt, s_remote_cnt, s_data
the second group: s_dist_01, s_dist_02, s_dist_03, s_dist_04, s_dist_05
the third group: s_dist_06, s_dist_07, s_dist_08, s_dist_09, s_dist_10
for each row of the table, the data is coded by the same generation matrix to obtain three sets of coded code words (i.e., encoded data):
the first group: (s_w_id, s_i_id, s_quantity), s_ytd, s_order_cnt, s_remote_cnt, s_data, r1, r2, r3
the second group: s_dist_01, s_dist_02, s_dist_03, s_dist_04, s_dist_05, r4, r5, r6
the third group: s_dist_06, s_dist_07, s_dist_08, s_dist_09, s_dist_10, r7, r8, r9
the three code words are then distributed by column/column group for nodes, and the distribution of one row of data is shown in FIG. 8.

If any three of the nodes fail, the corresponding node data is also lost. However, the original data can still be recovered by obtaining the remaining data for coding.

When the internal data bit width of the hardware implementation is large enough, it is also possible not to group, directly according to the generation matrix of M=18, K=9 to code, and then the resultant code word (i.e., coded data) is equally divided into nine nodes, the effect is the same as divided into three groups of calculation. Specifically, when the need to resist the failure of any three nodes, at least three nodes are required to store redundant information. So the original table of 17 columns of data can only be distributed in the remaining 6 nodes, erasure code algorithm requires an even distribution of data, but 17 columns can not be evenly distributed to 6 nodes, so we need to choose the minimum value greater than 17 and a multiple of 6, then M=18, so that each node can have three columns of data (one of the nodes have a column of fill data), a node lost on the loss of three copies of data, then a redundant node needs 3 If one node loses 3 copies of data, one redundant node needs 3 copies of redundant data, and 3 nodes need 9 copies of redundant data, then K=9.

Figure 9:
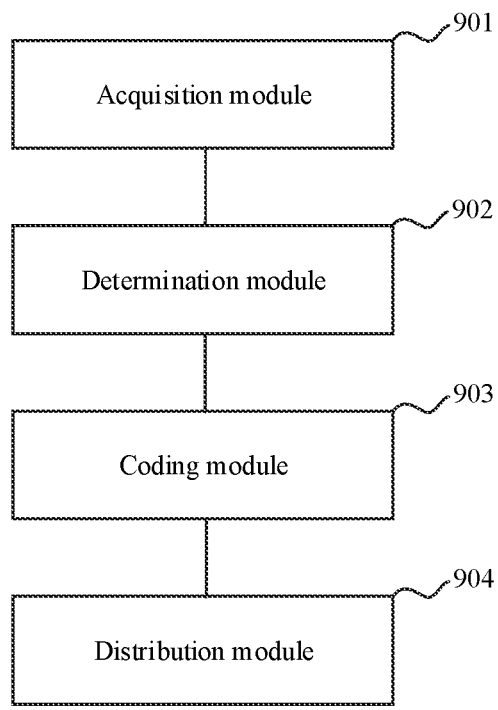
FIG. 9 illustrates a schematic diagram of the structure of a device for storing data in a distributed database proposed by an embodiment of the present invention.

Embodiments of the present application also present a device for storing data in a distributed database, the data in the distributed database is stored in accordance with a row storage mode and a column storage mode, respectively, as shown in FIG. 9, the device comprising:

an acquisition module 901, for obtaining the target row data that has changed based on a preset synchronization policy, when a change is detected in the data in the row storage mode;

a determination module 902, for determining the number of original data copies and the number of redundant data copies based on the attribute information and the number of failure-resistant nodes of the target row in which the target row data is located;

an coding module 903, for coding the target row data in accordance with a predetermined corrective coding algorithm based on the number of original data copies and the number of redundant data copies, generating coded data comprising original data of the number of original data copies and redundant data of the number of redundant data copies;

a distribution module 904, distributing each copy of the coded data equally by column or group of columns to different nodes in the distributed database for storage;

wherein, the attribute information comprises the number of bytes of each column in the target row or the number of columns in the target row, the number of failure-resistant nodes being the number of nodes storing each copy of the redundant data.

In the specific application scenario of this application, if the attribute information is the number of bytes for each column in the target row, the determination module, specifically for:

determining the number of original data copies based on the sum of the number of bytes in each the row;
determining the number of redundant data copies based on the product of the number of failure-resistant nodes and the maximum number of bytes in each the number of bytes.

In the specific application scenario of this application, if the attribute information is the number of columns, the determination module, specifically for:

determining the number of original data copies based on the number of columns or the number of cells in each grouping;
determining the number of redundant data copies based on the number of failure-resistant nodes;
wherein, the grouping is generated by dividing the number of columns according to predetermined grouping rules, the number of cells in each the grouping being equal, each the cell being a single column or a group of columns, the group of columns is generated after grouping a plurality of columns based on query relevance or after grouping based on the sum of the byte lengths of the columns.

In the specific application scenario of this application, if the attribute information is the number of columns, the determination module, specifically for:

$$M=\text{Ceiling}(L,n)$$

$$K=(M/n)*n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, n1 is the number of failure-resistant nodes, Ceiling is a ceiling function.

In the specific application scenario of this application, the changes include adding, updating or deleting, and the preset synchronization strategy includes log synchronization.

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for storing data in a distributed database, wherein the data in the distributed database are stored according to a row storage mode and a column storage mode, respectively, the method comprising:
   when a change is detected in the data in the row storage mode, obtaining target row data that has changed based on a preset synchronization policy;
   determining a number of original data copies and a number of redundant data copies based on an attribute information and a number of failure-resistant nodes of a target row in which the target row data is located;
   coding the target row data in accordance with a predetermined corrective coding algorithm based on the number of original data copies and the number of redundant data copies, generating coded data comprising original data of the number of original data copies and redundant data of the number of redundant data copies; and
   distributing each copy of the coded data equally by column or group of columns to different nodes in the distributed database for storage;
   wherein, the attribute information comprises a number of bytes of each column in the target row or a number of columns in the target row, the number of failure-resistant nodes being the number of nodes storing each copy of the redundant data.

2. The method according to the claim 1, wherein if the attribute information is the number of bytes for each column in the target row, determining the number of copies of the original data and the number of copies of the redundant data based on the attribute information and the number of failure-resistant nodes in the row in which the target row data is located, specifically:
   determining the number of original data copies based on the sum of the number of bytes in each the row;
   determining the number of redundant data copies based on the product of the number of failure-resistant nodes and the maximum number of bytes in each the number of bytes.

3. The method according to the claim 1, wherein if the attribute information is the number of columns, determining the number of original data copies and the number of redundant data copies based on the attribute information and the number of failure-resistant nodes in the row in which the target row data is located, specifically:
   determining the number of original data copies based on the number of columns or the number of cells in each grouping;
   determining the number of redundant data copies based on the number of failure-resistant nodes;
   wherein, the grouping is generated by dividing the number of columns according to predetermined grouping rules, the number of cells in each the grouping being equal, each the cell being a single column or a group of columns;
   the group of columns is generated after grouping a plurality of columns based on query relevance or after grouping based on the sum of the byte lengths of the columns.

4. The method according to the claim 1, wherein if the attribute information is the number of columns, determining the number of original data copies and the number of redundant data copies based on the attribute information and the number of failure-resistant nodes of the target row in which the target row data is located, specifically:

$$M=\text{Ceiling}(L,n)$$

$$K=(M/n)*n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, n1 is the number of failure-resistant nodes, Ceiling is a ceiling function.

5. The method according to the claim 1, wherein the changes include adding, updating or deleting, and the preset synchronization strategy includes log synchronization.

6. A device for storing data in a distributed database, wherein the data in the distributed database is stored in accordance with a row storage mode and a column storage mode, respectively, the device comprising:
   a processor configured to:
   obtain target row data that has changed based on a preset synchronization policy, when a change is detected in the data in the row storage mode;
   determine a number of original data copies and a number of redundant data copies based on an attribute information and a number of failure-resistant nodes of the target row in which the target row data is located;
   code the target row data in accordance with a predetermined corrective coding algorithm based on the number of original data copies and the number of redundant data copies, generating coded data comprising original data of the number of original data copies and redundant data of the number of redundant data copies; and
   distribute each copy of the coded data equally by column or group of columns to different nodes in the distributed database for storage;

wherein, the attribute information comprises a number of bytes of each column in the target row or the number of columns in the target row, the number of failure-resistant nodes being the number of nodes storing each copy of the redundant data.

7. The device according to the claim 6, wherein if the attribute information is the number of bytes for each column in the target row for:
- determining the number of original data copies based on the sum of the number of bytes in each the row;
- determining the number of redundant data copies based on the product of the number of failure-resistant nodes and the maximum number of bytes in each the number of bytes.

8. The device according to the claim 6, wherein if the attribute information is the number of columns:
- determining the number of original data copies based on the number of columns or the number of cells in each grouping;
- determining the number of redundant data copies based on the number of failure-resistant nodes;
- wherein, the grouping is generated by dividing the number of columns according to predetermined grouping rules, the number of cells in each the grouping being equal, each the cell being a single column or a group of columns;
- the group of columns is generated after grouping a plurality of columns based on query relevance or after grouping based on the sum of the byte lengths of the columns.

9. The device according to the claim 6, wherein if the attribute information is the number of columns:

$$M = Ceiling(L, n)$$

$$K = (M/n) * n1$$

wherein, M is the number of original data copies, K is the number of redundant data copies, L is the number of columns, the number of columns is the original number of columns or the number of columns after subsuming existing columns, n is the number of nodes in the distributed database where valid data information is stored, $n1$ is the number of failure-resistant nodes, Ceiling is a ceiling function.

10. The device according to the claim 6, wherein the changes include adding, updating or deleting, and the preset synchronization strategy includes log synchronization.

* * * * *